United States Patent
Augustini et al.

[11] Patent Number: 6,017,431
[45] Date of Patent: Jan. 25, 2000

[54] CATIONIC ELECTRODEPOSITABLE COATING COMPOSITION AND BATH THEREOF AND PROCESS FOR RETARDING THE GROWTH OF BACTERIA FOR SUCH A BATH

[75] Inventors: David J. Augustini, Westlake; Victor G. Corrigan, North Omlsted, both of Ohio; William D. Cook, Mesa, Ariz.; Alan J. Kaylo, Glenshaw, Pa.

[73] Assignee: PPG Industries Ohio, Inc., Cleveland, Ohio

[21] Appl. No.: 09/102,772

[22] Filed: Jun. 23, 1998

Related U.S. Application Data

[60] Provisional application No. 60/052,817, Jul. 17, 1997.

[51] Int. Cl.⁷ .................................................. C25D 13/10
[52] U.S. Cl. .......................... 204/499; 204/502; 523/415
[58] Field of Search .................................. 204/489, 499, 204/502; 523/415

[56] References Cited

U.S. PATENT DOCUMENTS

| | | | |
|---|---|---|---|
| 3,455,806 | 7/1969 | Spoor et al. | 204/181 |
| 3,793,278 | 2/1974 | De Bona | 260/29.2 EP |
| 3,928,157 | 12/1975 | Suematsu et al. | 204/181 |
| 3,936,405 | 2/1976 | Sturni et al. | 260/29.2 EP |
| 3,959,106 | 5/1976 | Bosso et al. | 204/181 |
| 3,984,299 | 10/1976 | Jerabek | 204/181 |
| 4,007,154 | 2/1977 | Schimmel et al. | 260/37 EP |
| 4,009,133 | 2/1977 | Jones | 260/29.2 TN |
| 4,104,147 | 8/1978 | Marchetti et al. | 204/181 C |
| 4,134,866 | 1/1979 | Tominaga et al. | 260/18 PN |
| 4,134,932 | 1/1979 | Kempter et al. | 260/831 |
| 4,136,025 | 1/1979 | Zwack et al. | 210/23 H |
| 4,148,772 | 4/1979 | Marchetti et al. | 260/29.2 EP |
| 4,230,552 | 10/1980 | Schimmel et al. | 204/181 C |
| 4,238,594 | 12/1980 | Pampouchidis | 528/69 |
| 4,332,711 | 6/1982 | Kooymans et al. | 523/402 |
| 4,352,842 | 10/1982 | Kooymans et al. | 427/385.5 |
| 4,397,990 | 8/1983 | Kooymans et al. | 525/167 |
| 4,401,774 | 8/1983 | Kooymans et al. | 523/402 |
| 4,405,763 | 9/1983 | Kooymans et al. | 525/438 |
| 4,420,574 | 12/1983 | Moriarity et al. | 523/404 |
| 4,423,166 | 12/1983 | Moriarity et al. | 523/414 |
| 4,468,307 | 8/1984 | Wismer et al. | 204/181 C |
| 4,530,945 | 7/1985 | Christenson et al. | 523/400 |
| 4,540,725 | 9/1985 | Jerabek et al. | 523/400 |
| 4,711,917 | 12/1987 | McCollum et al. | 523/400 |
| 4,724,244 | 2/1988 | Kempter et al. | 523/414 |
| 4,810,535 | 3/1989 | McCollum et al. | 427/410 |
| 4,891,111 | 1/1990 | McCollum et al. | 204/181.7 |
| 4,920,162 | 4/1990 | Clark et al. | 523/400 |
| 4,931,157 | 6/1990 | Valko et al. | 204/181.7 |
| 4,933,056 | 6/1990 | Corrigan et al. | 204/181.7 |
| 5,074,979 | 12/1991 | Valko et al. | 204/181.7 |
| 5,096,556 | 3/1992 | Corrigan et al. | 204/181.7 |
| 5,202,383 | 4/1993 | Moriarity et al. | 525/124 |
| 5,248,486 | 9/1993 | Matsuoka et al. | 422/294 |
| 5,264,146 | 11/1993 | Tobiason | 252/157 |
| 5,324,443 | 6/1994 | Arif et al. | 252/142 |
| 5,389,219 | 2/1995 | Zwack et al. | 204/181.1 |
| 5,464,887 | 11/1995 | Scott et al. | 523/501 |
| 5,565,109 | 10/1996 | Sweeny | 210/755 |
| 5,616,347 | 4/1997 | Alliger et al. | 424/665 |
| 5,627,197 | 5/1997 | Gante et al. | 514/326 |
| 5,635,248 | 6/1997 | Hsu et al. | 427/358 |

FOREIGN PATENT DOCUMENTS

| | | |
|---|---|---|
| 012463 | 6/1982 | European Pat. Off. . |
| 0165558 | 12/1985 | European Pat. Off. . |
| 0 361 882 | 4/1990 | European Pat. Off. . |
| 0 463 474 | 1/1992 | European Pat. Off. . |
| 350376 | 1/1974 | U.S.S.R. . |

*Primary Examiner*—Kishor Mayekar
*Attorney, Agent, or Firm*—Kenneth J. Stachel; Ann Marie Cannoni

[57] ABSTRACT

Electrodepositable coating composition bath is prepared and maintained to reduce the growth of bacteria in and around the bath. The composition has dispersed in an aqueous medium a resinous phase, said composition having a pH of at least 5, said resinous phase having basic nitrogen groups which are at least partially neutralized with an acid of the formula:

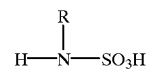

Formula 1 wherein R is hydrogen or an alkyl group with one to four carbon atoms. The amount of this acid to neutralize the cationic resinous phase can be an initial amount greater than 90 of the milliequivalents of sulfamic acid based on the total milliequivalents of neutralizing acid in the bath for the electrodeposition coating of articles in the bath. Also, the bath is maintained by post addition of sulfamic acid to a level of greater than 80 weight percent of the milliequivalents of neutralizing acid when the bath has less than or greater than 90 weight percent of the milliequivalents of neutralizing acid in the bath as sulfamic acid.

11 Claims, No Drawings

CATIONIC ELECTRODEPOSITABLE COATING COMPOSITION AND BATH THEREOF AND PROCESS FOR RETARDING THE GROWTH OF BACTERIA FOR SUCH A BATH

This application claims the benefit of U.S. Provisional Application No. 60/052,817, filed Jul. 17, 1997.

FIELD OF THE INVENTION

The present invention relates to cationic electrodepositable compositions and baths thereof with aqueous medium, the use of these compositions in the method of cationic electrodeposition, and the method for retarding the development or growth of bacteria in and around such baths.

Electrodeposition as a coating application method involves deposition of a film-forming composition under the influence of an applied electrical potential. Electrodeposition has become increasingly important in the coatings industry because by comparison with nonelectrophoretic coating means, electrodeposition offers higher plant utilization, outstanding corrosion protection and low environmental contamination. Cationic electrodeposition has steadily gained in popularity over anionic electrodeposition since its commercial introduction in 1972, and today it is the method of choice for applying a primer coating to motor vehicles.

In preparing the paint composition which is used in the cationic electrodeposition process, resinous binder which contains basic groups, such as basic nitrogen groups, is neutralized with an acid. The resultant cationic resin is dispersed in water and combined with pigment(s) and other additives normally used in the cationic electrodeposition process to form a paint. Typically, the neutralizing acids are organic acids such as acetic acid, dimethylolpropionic acid, formic acid, and lactic acid because these acids provide uniform and stable dispersions. Although the use of inorganic acids such as nitric, sulfuric and phosphoric acids are known as neutralizing agents in the cationic electrodeposition process, these acids do not normally provide satisfactory dispersions for the cationic electrodeposition process as practiced industrially.

In U.S. Pat. No. 4,933,056, it was disclosed that sulfamic acid can be used as a neutralizing agent for the cationic coating composition and that these compositions can be made to deposit with high film thickness and improved throwpower. In addition, it was shown that sulfamic acid can passivate the anode against the corrosivity of anolytes normally associated with cationic electrodeposition compositions which are neutralized with typical organic acids such as acetic acid and lactic acid. When coating compositions of the type described in U.S. Pat. No. 4,933,056 were introduced commercially in the early 1990's, they performed as expected, providing high film build, high throwpower, and anode passivation. In Examples III and V, electrodepositable coating baths were made including sulfamic acid neutralized reaction products of either epoxide group-containing resin and mixture of amines or acrylic polymer and amine.

In a typical commercial electrocoat operation, including those which utilize compositions described in U.S. Pat. No. 4,933,056, undeposited paint clings to the coated part as the part leaves the coating bath. In order to recycle the undeposited paint and decrease waste, the bath is ultrafiltered and the permeate of the ultrafiltration operation is used to rinse the excess paint or "drag-out" back into the original paint bath. This is accomplished by a series of rinse areas placed subsequent to the bath in which the permeate is stored and sprayed as a rinse over the coated part. The rinse containing the drag-out is allowed to flow by gravity back into the paint of the electrodeposition bath so it can be electrodeposited rather than lost.

These rinse sections occasionally become contaminated with actively growing colonies of bacteria. When the level of bacteria in the permeate rinse is sufficiently high, it can cause problems elsewhere in the electrocoat operation. Specifically, the colonies of bacteria can become dislodged and land on the painted surface resulting in a surface defect or they can clog the filters in the rinse recirculation system. In extreme cases the pH of the rinse section may increase as the bacteria consumes organic neutralizing acid, and the high pH rinse can cause coagulant to form in the paint as the permeate rinse is returned to the paint bath.

To counter the increasing pH problem, acetic acid is often added to the bath or rinse sections to lower the pH and prevent coagulum formation in the electrodeposition paint bath but this leads to more bacterial growth and the problem quickly returns. Another alternative is to add a bactericide, such as Kathon® biocide available from Rohm and Haas Company, Philadelphia, Pa., in order to kill the bacteria before the population level rises to a detrimental level. In a third approach, metal ions such as silver or copper can be added to the rinse sections either by the addition of the corresponding metal salts or by electrolytically oxidizing copper or silver metal submerged in the rinse tanks.

None of the present treatments for bacterial infestation of the electrocoat bath composition and ultrafiltrate rinse are entirely satisfactory. Bactericides eventually lose their effectiveness as they are depleted from the bath during use and the electrolytic introduction of metals can result in pollution thereby requiring capital and maintenance costs. The problem of bacteria in electrocoat operations has also increased in recent years as metals, such as lead, and solvents, such as butyl cellosolve, have been reduced to comply with environmental regulations.

SUMMARY OF THE INVENTION

It is an object of the present invention to retard the development or growth of bacteria or reduce the bacterial count in/for cationic electrodepositable bath coating compositions with the presence of a specific amount of sulfamic acid while limiting the amount of neutralizing carboxylic acid. In accordance with the present invention, it has surprisingly been found that certain sulfamic acid neutralized electrocoat bath compositions and methods of electrocoating can be practiced that exhibit improved resistance to bacterial infestation with little or no use of bactericides or metals that are designed to check the growth of the bacteria. The cationic electrodepositable compositions and methods of electrodeposition utilize compositions of a resinous phase dispersed in aqueous medium having: (a) active hydrogen-containing cationic resin electrodepositable on a cathode; (b) curing agent for crosslinking the resin of (a); and (c) optionally additional acid neutralized cationic electrodepositable materials such as cationic microgel, cationic grind vehicles, cationic polyoxyalkylene polyol and polyamine adducts, and cationic crater reducing materials, and the like; and d) optionally curing catalysts.

The sulfamic acid is present either from a larger initial amount of sulfamic acid as a neutralizing acid for the acid neutralizable cationic electrodepositable materials of the resinous phase of and/or a post addition to a formulated electrodeposition coating bath composition.

With the larger initial amount of sulfamic acid or with initial amounts less than the larger amount in the electrodepositable bath composition ("electrodepositable composition"), sulfamic acid can be added by post addition. The post addition involves the addition of an amount of sulfamic acid to the electrodepositable composition to raise the amount from the initial amount of sulfamic acid to at least 80 equivalent weight percent. This equivalent weight percent is of the total equivalents of acid for neutralization of the basic amine and quaternary ammonium groups of the cationic electrodepositable materials, including (a), in the electrodepositable bath composition (hereinafter referred to as "Equivalent Weight Percent"). When the initial amount of sulfamic acid in the electrodepositable composition is greater than 90 up to 100 Equivalent Weight Percent, the amount of post addition of sulfamic acid can be reduced or obviated.

The amount of the neutralization of the bath composition is usually referred to as total neutralization of the basic amines and quaternary amines or ammonium groups of the cationic resinous phase. Only a portion or partial neutralization rather than a total neutralization may be performed for the acid neutralizable cationic electrodepositable materials of the resinous phase. It is of this total or partial neutralization that the sulfamic acid is at least 80 Equivalent Weight Percent through post addition or greater than 90 percent from an initial amount.

For sulfamic acid neutralization of any one or more particular cationic electrodepositable materials in the electrodepositable composition, the amount of sulfamic acid can be from around 20 percent up to and exceeding 100 percent of the total theoretical neutralization of the amines and quaternary ammonium groups for that one or more cationic electrodepositable material. For instance, at least one of the acid neutralized acid neutralizable cationic electrodepositable materials in the cationic resinous phase dispersed in the aqueous medium of electrodepositable composition can have for dispersibility from 20 to 100 percent of the equivalents of amine and quaternary ammonium groups neutralized with sulfamic acid. Although there may be present some cationic electrodepositable materials that are neutralized with one or more other acids so long as for the total resinous phase of the bath composition at least 80 Equivalent Weight Percent is with sulfamic acid when post addition of sulfamic acid is used.

The post addition of sulfamic acid to a formulated or finished electrodepositable composition can be used to maintain the pH of the bath composition in the range of at least 5 to 8. When prepared with sufficiently low concentrations of carboxylic acids and or when an operating bath of the electrodepositable composition is adjusted in pH with sulfamic acid instead of a carboxylic acid such as acetic acid, it has been observed that the resultant bath of electrodepositable composition and corresponding ultrafiltrate rinse tanks also remain relatively free of bacteria for extended periods of time.

DETAILED DESCRIPTION OF THE INVENTION

In the following description except for the examples and the claims, the use of numerical values in ranges for temperature, pressure, pH, and amounts of and molecular weights of materials, and other reaction and operational conditions are stated, unless expressly indicated otherwise, as approximations as though the minimum and maximum values within the stated ranges were both preceded by the word "about". In this manner slight variations above and below, the stated ranges can be used to achieve substantially the same results as values within the ranges. Also, the disclosure of these ranges is intended as a continuous range including every value between the minimum and maximum values.

The active hydrogen-containing cationic resin electrodepositable on a cathode, which along with the curing agent constitutes the main vehicle of the electrodepositable composition, may be any suitable cationic resin known to those skilled in the art, but is preferably derived from a polyepoxide. The cationic resin can be prepared by reacting together a polyepoxide and a polyhydroxyl group-containing material selected from alcoholic hydroxyl group-containing materials and phenolic hydroxyl group-containing materials to chain extend or build the molecular weight of the polyepoxide. The reaction product can then be reacted with a cationic salt forming group to produce the cationic resin.

A chain extended polyepoxide is typically prepared as follows: the polyepoxide and polyhydroxyl group-containing material are reacted together neat or in the presence of an inert organic solvent such as a ketone, including methyl isobutyl ketone and methyl amyl ketone, aromatics such as toluene and xylene, and glycol ethers such as the dimethyl ether of diethylene glycol. The reaction is typically conducted at a temperature of 80° C. to 160° C. for about 30 to 180 minutes until an epoxy group-containing resinous reaction product is obtained. The equivalent ratio of reactants, i.e. epoxy:polyhydroxyl group-containing material is typically from 1.00:0.20 to 1.00:3.00.

Examples of polyepoxides are those having a 1,2-epoxy equivalency greater than one and preferably at least about two; that is, polyepoxides which have on average two epoxide groups per molecule. The epoxy compounds may be saturated or unsaturated, cyclic or acyclic, aliphatic, alicyclic, aromatic or heterocyclic. They may contain substituents such as halogen, hydroxyl, and ether groups. The preferred polyepoxides are polyglycidyl ethers of polyhydric alcohols such as cyclic polyols. Particularly preferred are polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as 1,2-cyclohexanediol and 1,2-bis(hydroxymethyl) cyclohexane. The preferred polyepoxides have epoxide equivalent weights ranging from 180 to 2000, preferably from 186 to 1200. Epoxy group-containing acrylic polymers can also be used. These polymers typically have an epoxy equivalent weight ranging from 750 to 2000.

Examples of polyhydroxyl group-containing materials used to chain extend or increase the molecular weight of the polyepoxide (i.e. through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used. Bisphenol A is preferred.

The active hydrogens associated with the cationic resin include any active hydrogens which are reactive with isocyanates within the temperature range of 93° C. to 204° C., preferably 121° C. to 177° C. Typically, the active hydrogens are selected from the group consisting of aliphatic hydroxyl, beta-hydroxyalkylamino, and primary and secondary amino groups, including mixed groups such as hydroxyl and primary amino. Preferably, the cationic resin will have an active hydrogen content of about 1 to 4 milliequivalents, more preferably 2 to 3 milliequivalents of active hydrogen per gram of resin solids.

The resin contains cationic salt groups which are preferably incorporated into the resin molecule as follows: the resinous reaction product prepared as described above is further reacted with a cationic salt group former. By "cationic salt group former", it is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt forming groups are sulfides which can be mixed with acid prior to reaction with the epoxy groups and form ternary sulfonium salt groups upon subsequent reaction with the epoxy groups.

When amines are used as the cationic salt formers, monoamines are preferred, and hydroxyl-containing amines are particularly preferred. Polyamines may be used but are not recommended because of a tendency to gel the resin. Tertiary and secondary amines are preferred to primary amines because primary amines are polyfunctional with respect to epoxy groups and have a greater tendency to gel the reaction mixture. If polyamines or primary amines are used, they should be used in a substantial stoichiometric excess to the epoxy functionality in the polyepoxide so as to prevent gelation and the excess amine should be removed from the reaction mixture by vacuum stripping or other technique at the end of the reaction. The epoxy may be added to the amine to ensure excess amine. Also, any mixtures or blends of these various amines and the below-described amines can be used.

Examples of hydroxyl-containing amines are alkanolamines, dialkanolamines, trialkanolamines, alkyl alkanolamines, and aralkyl alkanolamines containing from 1 to 18 carbon atoms, preferably 1 to 6 carbon atoms in each of the alkanol, alkyl and aryl groups. Specific examples include ethanolamine, N-methylethanolamine, diethanolamine, N-phenylethanolamine, N,N-dimethylethanolamine, N-methyldiethanolamine, triethanolamine, 3-aminopropyldiethanolamine and N-(2-hydroxyethyl)piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine and N,N-dimethylcyclohexylamine.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature of 50° C. to 150° C. may be done to hasten the reaction.

In the reaction of a tertiary amine with a polyepoxide, the tertiary amine can be prereacted with the neutralizing acid to form the amine salt and then the amine salt reacted with the polyepoxide to form a quaternary salt group-containing resin. The reaction is conducted by mixing the amine salt with the polyepoxide in water. Typically, the water is present in an amount ranging from 1.75 to 20 percent by weight based on total reaction mixture solids for the electrodepositable coating composition with all of its non-aqueous components.

In forming the quaternary ammonium salt group-containing resin, the reaction temperature can be varied from the lowest temperature at which the reaction will proceed, generally room temperature or slightly thereabove, to a maximum temperature of 100° C. (at atmospheric pressure). At higher pressures, higher reaction temperatures may be used. Preferably, the reaction temperature is in the range of 60° C. to 100° C. Solvents such as a sterically hindered ester, ether, or sterically hindered ketone may be used but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147 (column 6, line 23 to column 7, line 23). The ketimine groups decompose upon dispersing the amine-epoxy resin reaction product in water.

In addition to resins containing amine salts and quaternary ammonium salt groups, cationic resins containing ternary sulfonium groups may be used in the composition of the present invention. Examples of these resins and their method of preparation are described in U.S. Pat. No. 3,793,278 to DeBona and U.S. Pat. No. 3,959,106 to Bosso, et al.

The extent of cationic salt group formation should be such that when the resin is mixed with an aqueous medium and other ingredients, a stable dispersion of the electrodepositable composition will form. By "stable dispersion", it is meant one that does not settle or is easily redispersible if some settling occurs. Moreover, the dispersion should be of sufficient cationic character that the dispersed resin particles will migrate toward and electrodeposit on a cathode when an electrical potential is set up between an anode and a cathode immersed in the aqueous dispersion.

Generally, the active hydrogen-containing, cationic salt group-containing resin in the electrodepositable composition of the present invention contains from 0.1 to 3.0, preferably from 0.1 to 0.7 milliequivalents of cationic salt group per gram of resin solids. The cationic resin is preferably non-gelled, having a number average molecular weight ranging from 2000 to 15,000, preferably from 5000 to 10,000. By "non-gelled", it is meant that the resin is substantially free from crosslinking, and prior to cationic salt group formation, the resin has a measurable intrinsic viscosity when dissolved in a suitable solvent. In contrast, a gelled resin having an essentially infinite molecular weight would have an intrinsic viscosity too high to measure. The active hydrogen-containing, cationic salt group-containing electrodepositable resin of (a) is usually present in the electrodepositable composition in an amount ranging from 40 to 90 percent by weight, preferably from 50 to 80 percent by weight based on the total weight of resin solids.

The reaction product of the cationic salt group former and the polyepoxide is made cationic and water dispersible either before, after or with reaction with the polyepoxide by at least partial neutralization with an acid. Sulfamic acid is used in an effective amount to at least partially neutralize the basic amine and quaternary ammonium groups of the cationic electrodepositable epoxy amine adduct. The partial neutralization is from 20 to 100 percent, and even greater, of these basic amine and quaternary ammonium groups. This amount of sulfamic acid used to neutralize the epoxy amine adduct combined with the amount of sulfamic used to neutralize other acid neutralizable cationic electrodepositable materials in the electrodepositable composition gives an initial amount of sulfamic acid of greater than 90 to 100 Equivalent Weight Percent of the total equivalents of neutralizing acid. This initial amount of sulfamic acid can be 90 Equivalent Weight Percent or lower and even as low as 50 or 60 Equivalent Weight Percent with the post addition of sulfamic acid. This lower initial amount need only be sufficient to allow for enough post addition of sulfamic acid to reach at least the 80 Equivalent Weight Percent amount of sulfamic acid. A minor amount of other acids can neutralize the basic amine and quaternary ammonium groups, and these include organic and inorganic acids such as formic acid, acetic acid, lactic acid, and phosphoric acid. This minor amount is up to 20 Equivalent Weight Percent with post addition and up to 10 Equivalent Weight Percent without post addition of sulfamic acid. By "sulfamic acid", it is meant sulfamic acid itself or derivatives thereof; i.e. an acid of Formula 1:

Formula 1

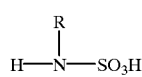

wherein R is hydrogen or an alkyl group with one to four carbon atoms. The sulfamic acid of Formula 2 is preferred:

Formula 2

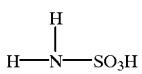

The extent of neutralization varies with the particular reaction product involved. However, sufficient acid should be used to disperse the electrodepositable composition in the aqueous medium such as water. Typically, the amount of acid used provides at least 20 percent of all of the total neutralization. Excess acid may also be used beyond the amount required for 100 percent total neutralization.

Besides the epoxy-amine reaction products, film-forming resins can be selected from amino group-containing acrylic copolymers such as those described in U.S. Pat. Nos. 3,455,806 and 3,928,157. Also, one-component compositions as described in U.S. Pat. No. 4,134,866 and DE-OS U.S. Pat. No. 2,707,405 can also be used as the film-forming resin.

Preferably, the active hydrogens within the active hydrogen-containing cationic resin generally are reactive with curing agents for transesterification, transamidation, and/or transurethanization with curing agents such as isocyanate and/or polyisocyanate curing agents under coating drying conditions. Suitable drying conditions for at least the partially capped or blocked isocyanate curing agents include elevated temperatures preferably in the range of 93° C. to 204° C., most preferably 121° C. to 177° C., as are known to those skilled in the art. Preferably, the active hydrogen-containing cationic resin will have an active hydrogen content of 1.7 to 10 milliequivalents, more preferably 2.0 to 5 milliequivalents of active hydrogen per gram of resin solids.

Typically, the active hydrogen-containing cationic resin of component (a) is present in the electrodepositable composition in amounts of 55 to 75, preferably 65 to 70 percent by weight based on weight of main vehicle resin solids. By "main vehicle resin solids", it is meant resin solids attributable to the active hydrogen-containing, cationic salt group-containing resin of component (a) and the curing agent(s) for transesterification, transamidation, or transurethanization as component (b).

The electrodepositable composition of the present invention also contains the curing agent(s) (b) for one of the aforementioned types of curing. For example, a polyisocyanate curing agent of component (b) may be a fully capped polyisocyanate with substantially no free isocyanate groups, or it may be partially capped and reacted with the resin backbone as described in U.S. Pat. No. 3,984,299 or 5,074, 979 or as taught in U.S. Pat. No. 4,009,133. The polyisocyanate can be an aliphatic or an aromatic polyisocyanate or a mixture of the two. Diisocyanates are preferred, although higher polyisocyanates can be used in place of or in combination with diisocyanates. Generally, the capped isocyanates under appropriate drying conditions de-cap and react with reactive hydrogens as in hydroxyl groups to form urethane groups and with reactive amines to form substituted urea groups. Also, di- and polyisocyanates can de-cap or deblock under appropriate drying conditions and react as transesterification and/or transamidation crosslinkers.

Nonexclusive examples of the transesterification curing agents include those as described in European Application No. 12,463. Examples of the latter curing mechanisms involve isocyanates reacting with malonic ester or acetoacetic ester. These crosslinkers as well as other similar crosslinkers known to those skilled in the art can optionally be used for transesterification or transamidation like aminoplast resins and aldehyde condensates like phenolformaldehyde, urea-formaldehyde, triazine-formaldehyde and phenol allyl ether-formaldehyde. Also, cationic electrodeposition compositions prepared from Mannich bases such as described in U.S. Pat. No. 4,134,932 can be used.

Examples of crosslinkers or curing agents are suitable aromatic, aliphatic including cycloaliphatic, diisocyanates and polyisocyanates. Suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate (MDI) and 2,4- or 2,6-toluene diisocyanate, and mixtures thereof (TDI). Examples of suitable higher polyisocyanates are triphenylmethane-4,4', 4"-triisocyanate, 1,2,4-benzene tri-isocyanate and polymethylene polyphenyl isocyanate. Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used. A mixture of diphenylmethane-4,4'-diisocyanate and polymethylene polyphenyl isocyanate is preferred. Usually, the molecular weight of the crosslinker measured as viscosity average molecular weight ("Mv") is less than 40,000 in order to achieve high flowability.

Any suitable aliphatic, cycloaliphatic or aromatic alkyl monoalcohol or phenolic compound or oxime or lactam or amine may be used as a capping agent for the at least partially capped polyisocyanate curing agent in the composition of the present invention. Nonexclusive examples include: lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Diethylene glycol butyl ether is preferred among the glycol ethers. Other suitable capping agents include oximes such as methyl ethyl ketoxime, acetone oxime and cyclohexanone oxime, lactams such as epsilon-caprolactam, and amines such as dibutyl amine.

The capped polyisocyanate curing agent of component (b) is typically present in the electrodepositable composition in amounts of 25 to 45, preferably 30 to 35 percent by weight based on weight of main vehicle resin solids. Typically, there is sufficient polyisocyanate present in the composition of the present invention to provide 0.1 to 1.2 capped isocyanate groups for each active hydrogen in the cationic resin of component (a).

Of the optional additional acid neutralizable cationic electrodepositable materials that can be present in the electrodepositable composition, at least one is preferably present. Preferably, one that is present is cationic microgel, and suitable microgels are those of U.S. Pat. No. 5,096,556, hereby incorporated by reference. Such cationic aqueous microgels when used in the process of cationic electrodeposition result in the attainment of good edge coverage and crater control while maintaining smooth films. Such cationic microgel dispersion can be prepared by any method known to those skilled in the art. For instance, a reactive mixture of the cationic polyepoxide-amine reaction product and the polyepoxide crosslinking agent is dispersed in aqueous medium. The dispersion step can be accomplished by adding the polyepoxide-amine reaction product, preferably at elevated temperatures of from 100° C. to 150° C. to a mixture of water and acid to form a cationic dispersion of the resin in water. Typically, the solids content of the resulting dispersion will be 20 to 50 percent by weight and the degree of neutralization will be from 20 to 100 percent of the total theoretical neutralization.

For neutralization of the microgel, as noted above for the polyepoxide amine adduct, the acid is sulfamic acid for all or a part of the neutralization. Again, minor amounts of other acids can be used where such other acids include organic acid such as formic acid, lactic acid and acetic acid as well as inorganic acid such as phosphoric acid and blends of acids including blends of organic and inorganic acids can be used. The extent of neutralization depends upon the particular reaction product and usually only sufficient acid is added to stabilize the resulting microgel dispersion.

The expression "cationic polyepoxide-amine reaction product which contains primary and/or secondary amine groups" includes primary and secondary amine groups and the acid salts thereof and is also referred to as the "epoxy amine adduct". The polyepoxide crosslinking agent usually dissolved in water-immiscible co-solvent such as methyl isobutyl ketone is then slowly stirred into the cationic polyepoxide-amine dispersion. This step is usually accomplished at ambient temperature and additional water may optionally be added. Typically, the solids content of the mixture will be 10 to 40 percent by weight. Although the mixture may be reactive at room temperature, the dispersion is usually heated with continued stirring such that the final degree of crosslinking will be accomplished in a reasonable period of time. Typically, the dispersion is heated to 40° C. to 90° C. for 1 to 6 hours. During the heating step, the resultant dispersion begins to thicken and typically over this temperature range and time, the crosslinking reaction will be essentially complete.

Generally, any of the aforementioned polyepoxide amine adducts or cationic polyepoxide-amine reaction products used as part of the main vehicle can be used for the microgel. This includes the polyepoxide-polyether polyol product which can be reacted with a polyamine having ketimines. The reaction to form the microgel can be conducted neat, or, optionally, in the presence of suitable solvent. The reaction may be exothermic and cooling may be desired. However, heating to a moderate temperature, that is, within the range of 50° C. to 150° C., may be used to hasten the reaction.

The reaction product of amine with the polyepoxide resin attains its cationic character by at least partial neutralization with sulfamic acid alone or in mixture with other acids as described above for the polyepoxide amine adduct of the main vehicle. The extent of neutralization need only utilize sufficient acid to disperse the microgel in water. Typically, the amount of acid used will be sufficient to provide at least 30 percent of the total theoretical neutralization. Excess acid beyond that required for 100 percent total theoretical neutralization can also be used. In general, most of the cationic resins contain from 10 to 300, preferably from 30 to 100 milli-equivalents of cationic group per hundred grams of resin solids. The cationic resinous binder (the epoxy/amine adduct) should preferably have weight average molecular weight, as determined by gel permeation chromatography using a polystyrene standard, of less than 100,000, more preferably less than 75,000 and most preferably less than 50,000 in order to achieve high flowability.

In the reaction of the tertiary amine with the advanced epoxy resin, the tertiary amine can be prereacted with the acid such as those mentioned above to form the amine salt and the salt reacted with the epoxy resin to form the quaternary ammonium salt group-containing resin. The reaction is conducted by mixing the amine salt and the polyepoxide resin together in the presence of water. Typically, the water is employed on the basis of 1.75 to 20 percent by weight based on total reaction mixture solids. Alternately, the tertiary amine can be reacted with the epoxy resin in the presence of water to form a quaternary ammonium hydroxide group-containing polymer which, if desired, may be subsequently acidified. The quaternary ammonium hydroxide-containing polymers can also be used without acid, although their use is not preferred. The cationic microgels can be recovered from the aqueous dispersions as dried products such as by evaporation, spray drying or the like and the dried product used as such.

Another acid neutralizable cationic electrodepositable material optionally useful but preferably present in the electrodepositable composition includes polyepoxide-polyoxyalkylenepolyamine resins like those of U.S. Pat. No. 4,420,574 and polyoxyalkylenepolyamine-polyepoxide adduct like that of Example F of U.S. Pat. No. 4,891,111 and Example 1B of U.S. Pat. No. 4,810,535. Examples of polyepoxide-polyoxyalkylene-polyamine reaction products as anti-cratering agents are those described in U.S. Pat. No.

4,423,166. All of these patents are hereby incorporated by reference for their teachings of the types and amounts of these cationic materials.

Also, as noted in U.S. Pat. No. 4,933,056 (Corrigan, et al.), incorporated herein by reference, acid neutralizable cationic electrodepositable materials as grind vehicles for pigments can be used in the electrodepositable composition. Such a resin can be a quaternary ammonium salt group-containing resin. This quaternizing agent like that of U.S. Pat. No. 5,464,887 can be formed where the reaction temperature can be varied from the lowest temperature at which the reaction will proceed, generally room temperature or slightly thereabove, to a maximum temperature of 100° C. (at atmospheric pressure). At higher pressures, higher reaction temperatures may be used. Preferably, the reaction temperature is in the range of 60° C. to 100° C. Solvents such as a sterically hindered ester, ether, or sterically hindered ketone may be used but their use is not necessary. The dispersions can be combined with ungelled cationic resins which are electrodepositable on the cathode to form an aqueous resinous dispersion suitable for use in electrodeposition. Once again, acid neutralization of these materials to render them at least water dispersible and electrodepositable is with sulfamic acid as described above for the other cationic materials.

Also, quaternary onium (e.g., ammonium, sulfonium, and phosphonium) salt group-containing epoxy resins as taught in U.S. Pat. No. 3,936,405 can be sulfamic acid neutralized and useful as grinding media in preparing stable pigment dispersions useful in water-dispersible electrodepositable compositions. The resins are prepared by reacting a material selected from the group consisting of amine salts, phosphine-acid mixtures, and sulfide-acid mixtures with a 1,2-epoxy group containing material wherein a ratio of at least 0.4 equivalents of quaternary onium groups are produced per equivalent of epoxy group initially present. Preferably, the system contains at least a small amount of polyoxyalkylene glycol. Once again, acid neutralization of these materials to render them at least water dispersible and electrodepositable is with sulfamic acid as described above for the other cationic materials.

The amounts of these various acid neutralized cationic electrodepositable materials varies for each of the materials but generally any one of these materials is present in the composition in an amount up to 50 weight percent of the resin solids of the electrodepositable composition. For instance, three or more of these acid neutralizable cationic electrodepositable materials can be present and the total amount of the three of them can be up to 60 or more weight percent of the resin solids. These are at least partially neutralized with the sulfamic acid of Formula 1. Neutralization is to the extent that the Equivalent Weight Percentage of the total milliequivalents of neutralizing acid for the basic amine groups from the sulfamic acid can be at least 80 percent. This is also taking into consideration the post addition with sulfamic acid. Hence, the bath of the electrodepositable composition will have less than 20 Equivalent Weight Percent of such total milliequivalents of neutralizing acid from carboxylic acids. Such a bath of electrodepositable coating is maintained with the post addition of sulfamic acid to have the pH of at least 5 up to 8 but preferably up to 6.5.

Metal catalysts are optionally present in the electrodepositable composition of the present invention, normally in the form of a dispersion or as an aqueous solution of a metal salt. The catalysts, which are often solids, are typically dispersed in a conventional pigment grinding vehicle such as those disclosed in U.S. Pat. No. 4,007,154, by a grinding or milling process. If the catalyst is water soluble, it may simply be dissolved in water. The catalysts are typically used in amounts of about 0.005 to about 2 percent by weight metal based on weight of total solids in the composition of the present invention. Suitable catalysts include tin compounds such as dioctyltin oxide and dibutyltin oxide, and lead-containing compounds such as lead silicate, lead cyanamide, lead oxide, and lead salts. Bismuth-, manganese-, zinc-, iron-, and other metal-containing compounds as known to those skilled in the art are also suitable. Mixtures of the above-mentioned metal compounds may also be used.

The electrodepositable composition may also optionally contain a coalescing solvent such as hydrocarbons, alcohols, esters, ethers and ketones. Examples of preferred coalescing solvents are alcohols, including polyols, such as isopropanol, butanol, 2-ethylhexanol, ethylene glycol and propylene glycol; ethers such as the monobutyl and monohexyl ethers of ethylene glycol; and ketones such as methyl isobutyl ketone and isophorone. The coalescing solvent is usually present in an amount up to about 40 percent by weight, preferably ranging from about 0.05 to about 25 percent by weight based on total weight of the electrodepositable composition.

The electrodepositable composition of the present invention may further contain pigments and various other optional additives such as plasticizers, surfactants, wetting agents, defoamers, and anti-cratering agents.

Examples of suitable surfactants and wetting agents include alkyl imidazolines such as those available from Geigy Industrial Chemicals as GEIGY AMINE C, and acetylenic alcohols available from Air Products and Chemicals as SURFYNOL. Examples of defoamers include a hydrocarbon containing inert diatomaceous earth available from Crucible Materials Corp. as FOAMKILL 63. These optional ingredients, when present, are usually used in an amount up to 30 percent by weight, typically about 1 to about 20 percent by weight based on weight of resin solids.

Suitable pigments include, for example, iron oxides, lead oxides, strontium chromate, carbon black, coal dust, titanium dioxide, talc, clay, silica, lead silicate, and barium sulfate, as well as color pigments such as cadmium yellow, cadmium red, chromium yellow, and the like. The pigment content of the aqueous dispersion, generally expressed as the pigment to resin (or pigment to binder) ratio (P/B), is usually 0.05:1 to 1:1.

The composition of the present invention comprising the cationic resin, the capped polyisocyanate curing agent, the catalyst, and the optional additives mentioned above is used in an electrodeposition process in the form of an aqueous dispersion. By "dispersion", it is meant a two-phase transparent, translucent, or opaque aqueous resinous system in which the resin, pigment, and water insoluble materials are in the dispersed phase while water and water soluble materials comprise the continuous phase. The dispersed phase has an average particle size less than about 10 microns, preferably less than 5 microns. The aqueous dispersion preferably contains at least about 0.05 and usually about 0.05 to about 50 percent by weight resin solids, depending on the particular end use of the dispersion. The dispersion is a stable dispersion as is defined above.

The electrodepositable composition of the present invention, when used in an electrocoating process, has a temperature range for curing of 325° F. to 400° F. (162.7° C. to 204.4° C. ) for conventional electrodepositable compositions at conventional metal catalyst levels; i.e., about 0.2 to about 2.0 percent by weight metal based on the weight of total solids.

In the process of electrodeposition, the aqueous dispersion is placed in contact with an electrically conductive anode and cathode. Upon passage of an electric current between the anode and cathode while they are in contact with the aqueous dispersion, an adherent film of the electrodepositable composition will deposit in a substantially continuous manner on the cathode. The film will contain the active hydrogen-containing resin, the curing agent, the catalyst, additional cationic electrodepositable materials, and the optional additives from the resinous or non-aqueous phase of the dispersion. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter) and tends to decrease quickly during the electrodeposition process, indicating formation of a continuous self-insulating film. Any electroconductive substrate, especially metal substrates such as steel, zinc, aluminum, copper, magnesium or the like can be coated with the electrodepositable composition of the present invention. Steel substrates are preferred. It is customary to pretreat the substrate with a phosphate conversion, usually a zinc phosphate conversion coating, followed by a rinse which seals the conversion coating.

After electrodeposition, the coating is heated to cure the deposited composition. The heating or curing operation is usually carried out at a temperature in the range of from 200° F. to 400° F. (93.3° C. to 204.4° C.), preferably from 250° F. to 340° F. (121.1° C. to 171.1° C.) for a period of time ranging from 10 to 60 minutes. The thickness of the resultant film is usually from about 10 to 50 microns.

With the continuous coating of substrates over a period of time the pH of the bath of the electrodepositable composition can increase due to loss of acid, especially if large amount of bacteria are present. This may be the case if the initial amount of sulfamic acid in the electrodepositable composition is greater than 90 equivalent weight percent. With the addition of sulfamic acid to the bath the growth of bacteria in the rinse areas of the bath and the bath itself is curtailed. This results in a concomitant advantage of reducing the tendency of the bath to increase in pH. The sulfamic acid can be added as the solid or as an aqueous solution of the dissolved or suspended sulfamic acid. Generally, the solution has a concentration of the sulfamic acid in the range of 10 to 20 weight for weight (w/w) of water. The amount of sulfamic acid added to the bath depends on the type of sulfamic acid added and the method of addition. The amount is effective to maintain the pH of the bath in the range of 5 to 8, most preferably 5.5 to 6.5. Preferably, the sulfamic acid is added as a solution with a concentration of 15 percent w/w water.

The invention will be further described by reference to the following examples. Unless otherwise indicated, all parts are by weight.

EXAMPLES

Example 1 shows the preparation of a sulfamic acid solution which was used as a post addition to an electrodepositable bath coating composition in a lab-scale electrodeposition tank.

Example 1

Part A—Preparation of Sulfamic Acid

A 15% (w/w) solution of sulfamic acid was prepared by adding 2,850 grams of sulfamic acid to 16,150 grams of deionized water under mild agitation at 75° F. (23.9° C.). The acid dissolved within 30 minutes, and the temperature dropped to 63° F. (17.2° C.). The solution's acid milliequivalents/gram of sample was determined to be 1.581.

Example 1

Part B—Electrodeposition of Metal Substrate

A lab scale tank, as part of a continuous coating device, was filled with four gallons (15.14 liters) ED5450, a commercial electrocoat primer that was previously commercially used to coat parts and became bacterially infected. The ED5450 composition is commercially available from PPG Industries Inc. as a two-component composition comprised of the resin component and the paste component. This electrodepositable composition had an initial sulfamic acid concentration as shown in Table 1 for an amount of 0 grams of post addition of sulfamic acid. The lab scale tank was equipped with a holding member for a roll of four-inch (10.16 cm.) wide aluminum foil above one end of the tank, a member for submerging the foil in the electrodepositable composition, and a take-up or pulling member to pull the foil through the bath. The bath was continuously fed with fresh electrodepositable composition and a minor amount of the electrodepositable composition was removed for continuous ultrafiltration and the ultrafiltrate was placed back into the bath to simulate a rinse section for the bath.

The primer was electrodeposited at 85° F. (29.4° C.) at a voltage in the range of 140 to 250 volts and an amperage in the range of 1.0 to 1.7 amps onto the submerged four-inch (10.16 cm.) wide aluminum foil, which did not have any pretreatment, moving through the bath at a rate of approximately two ft/min (about 1 cm./second). Film thickness per side of foil was 0.6 to 1.2 mils (15.2 to 30.5 microns). Solid material deposited on the foil during the coating process was replenished with electrodepositable composition added as two separate components of the pigment grind vehicle and catalyst paste (similar to a component of Example 2E below without sulfamic acid but with carboxylic acid neutralization) and resin feed (cationic electro depositable resin) after coating 125 feet (38.1 meters) of foil. Bath pH was continuously monitored and adjusted to a range of most preferably 5.5 to 6.5 periodically with additions of a 15 percent sulfamic acid solution of Part A of Example 1.

Table 1 presents the change in acid composition in milliequivalents/gram (meq/g) on resin solids versus the amount of coated coil. The bath pH and the various acid equivalents were measured according to the following tests where the acetic and lactic acids were originally present in the ED5450 commercial electrocoat primer. The sulfamic acid was titrated with sodium hydroxide and the electrodepositable composition, anolyte, and rinse water were titrated with potassium hydroxide according to standard analytical titration methods and the milliequivalents of the respective acid were calculated with the results of the concentration of base needed to neutralize the sample. The pH was determined with a commercial pH meter available from Fisher-Scientific Company. The bacterial count in counts per milliliter was determined by the standardized method issued by the American Public Health Association (APHA) and is SMEWW 9215C (Standard Method for Examination of Water and Waste Water).

TABLE 1

| Coated Coil (ft)/(m)[1] | 15% Sulfamic acid solution (grams) | Bath pH | Sulfamic acid (meq/g) | Acetic Acid (meq/g) | Lactic acid (meq/g) | Bacterial Count |
|---|---|---|---|---|---|---|
| 0/0 | 0 | 6.53 | 0.142 | 0.097 | 0.006 | $2 \times 10^6$ |
| 1000/304.8 | 48 | 6.23 | 0.168 | 0.043 | 0.022 | $3 \times 10^6$ |
| 1500/457.2 | 44 | 6.11 | 0.2 | 0.036 | 0.026 | $9 \times 10^6$ |
| 2000/609.6 | 60 | 5.99 | 0.214 | 0.025 | 0.03 | <100 |
| 2250/685.8 | 48 | 5.98 | 0.24 | 0.3 | 0.025 | <100 |

[1](ft)/(m) is feet for the first number before the slash and the conversion of that number to meters after the slash rather than the slash indicating any mathematical operation by itself.

As can be seen in Table 1 with increasing sulfamic acid and generally slightly decreasing acetic and lactic acid milliequivalents per gram, the bacterial count in the bath decreased. The decrease was more pronounced with the amount of sulfamic acid sufficient to reduce the pH to less than 6.

Example 2

This is a prophetic example, analogous to Example III of U.S. Pat. No. 4,933,056, where the lactic acid of Examples B, C, D, and E of U.S. Pat. No. 4,933,056 would be replaced by sulfamic acid, and the acetic acid of Example A of U.S. Pat. No. 4,933,056 would be replaced by sulfamic acid.

Example 2A

The following example is similar to Example A of U.S. Pat. No. 4,933,056 except that there would be no crosslinker, and butyl carbitol formal would be used as a diluent in place of 2-butoxyethanol, and sulfamic acid instead of acetic acid would be used as a solubilizing acid.

The new polyepoxidepolyoxyalkylene-diamine adduct would be prepared from the following ingredients:

TABLE IIA

| Ingredients | Parts by Weight |
|---|---|
| EPON 828 | 404 |
| Bisphenol A | 122.5 |
| Butyl Carbitol formal | 58.5 |
| Ethyltriphenyl phosphonium iodide | 0.4 |
| Butylcarbitol formal[1] | 160.4 |
| Jeffamine D-2000 | 1449.5 |

[1]A reaction product of 2 moles of diethylene glycol butyl ether and 1 mole of formaldehyde, would be prepared as generally described in U.S. Pat. No. 4,891,111.

The EPON 828, bisphenol A, butylcarbitol formal and ethyl triphenyl phosphonium iodide would be charged to a reaction vessel and heated under a nitrogen atmosphere to 125° C. The mixture would be allowed to exotherm but would be maintained in a way to keep the peak exotherm below 180° C. The reaction would be held at 160° C. to 170° C. for one hour. The second charge of butylcarbitol formal would be added followed by rapid addition of Jeffamine D-2000. The mixture then would be held at 130° C. for three hours. The resin mixture (1866 parts) would be dispersed in aqueous medium by adding it to a mixture of 60.29 parts of sulfamic acid and 1925.6 parts of deionized water. After 60 minutes, the mixture would be further thinned with 1812.7 parts of deionized water to give a dispersion having a solids content of 34 percent.

Examples 2B and 2C

A quaternizing agent and grind vehicle based on sulfamic acid (as compared to lactic acid in Examples B and C of U.S. Pat. No. 4,933,056) would be prepared as follows:

TABLE IIB

Quaternizing Agent

| Ingredients | Solution Weight (grams) | Solid Weight |
|---|---|---|
| 2-Ethylhexanol half-capped toluene diisocyanate in MIBK | 505.8 | 480.5 |
| Dimethylethanolamine (DMEA) | 128.8 | 128.8 |
| 2-Butoxyethanol | 58.1 | — |
| Sulfamic Acid | 112.2 | 112.2 |
| Deionized water | 130.0 | — |

The 2-ethylhexanol half-capped toluene diisocyanate would be added to the DMEA at room temperature in a flask under nitrogen. The mixture would exotherm and would be stirred for 20 minutes at 80° C. The 2-butoxyethanol would be charged and would be mixed for 20 minutes followed by the addition of the sulfamic acid over a 12-minute period. The acid containing mixture would be warmed to 90° C., and the deionized water would be added and would be stirred to give the quaternizing agent.

The pigment grinding vehicle would be prepared as follows:

TABLE IIC

| Ingredients | Solution Weight (grams) | Solid Weight |
|---|---|---|
| EPON 828[a] | 950.0 | 950.0 |
| Bisphenol A | 380.0 | 380.0 |
| Xylene | 34.0 | — |
| Ethyltriphenol phosphonium iodide | 1.0 | 1.0 |
| 2-Ethylhexanol half-capped toluene diisocyanate in MIBK | 546.0 | 518.7 |
| 2-Butoxyethanol | 1532.0 | — |
| Quaternizing agent described above | 559.5 | 431.8 |
| 2-Butoxyethanol | 302.2 | — |

[a]Diglycidyl ether of Bisphenol A available from Shell Oil and Chemical Co.

The EPON 828, Bisphenol A and xylene would be charged under a nitrogen atmosphere to a suitable reaction vessel and would be heated to 110° C. to 115° C. until all the Bisphenol A would melt. The ethyltriphenyl phosphonium iodide catalyst would be added and the mixture would be heated to about 130° C. to initiate the reaction. The reaction mixture would be permitted to exotherm to 160° C. to 190° C. and an hour hold would be started as soon as the temperature would exceed 160° C. When the exotherm dissipates, heat would be used to maintain a 165° C. to 170° C. temperature for the remainder of the hour. Upon completion of the hold, the mixture would be cooled to 130° C. to 135° C. and the 2-ethylhexanol half-capped toluene diisocyanate would be added while maintaining 120° C. to 127° C. The reaction mixture would be held at 120° C. to 127° C. for an additional hour and the 2-butoxyethanol would be added while allowing the mixture to cool to 80° C. to 85° C. After the addition of 2-butoxyethanol, the quaternizing solution would be added over two hours while maintaining 80 to 85° C. and the resulting mixture would be held at this temperature until an acid value of less than 1 is obtained. The final product might have a solids content of about 54 percent.

Example 2D

A catalyst paste would be prepared from the sulfamic acid based grind vehicle of Example C.

TABLE IID

| Ingredients | Parts by Weight | Solids |
| --- | --- | --- |
| Grind Vehicle of Example 2C | 151.9 | 83.1 |
| Deionized water | 264.4 | — |
| Dibutyltin oxide | 204.1 | 204.1 |
| | 620.4 | 287.2 |

The ingredients would be mixed together and ground in a steel ball mill to a Hegman No. 7 grind.

Example 2E

A pigment paste would be prepared from the sulfamic acid based grind vehicle of Example 2C and catalyst paste of Example 2D.

TABLE IIE

| Ingredients | Parts by Weight | Solids |
| --- | --- | --- |
| Grind Vehicle of Example 2C | 237.11 | 129.7 |
| Deionized water | 378.15 | — |
| Titanium Dioxide | 564.31 | 564.31 |
| Carbon Black | 16.54 | 16.54 |
| Lead Silicate | 33.08 | 33.08 |
| Catalyst Paste of Example 2D | 87.38 | 40.46 |
| | 1316.57 | 784.09 |

The above ingredients would be mixed in the order shown and would be ground in a steel ball mill to a Hegman value of 7.

Example III

A bath would be prepared comparable to Example III of U.S. Pat. No. 4,933,056 using the sulfamic acid based polyepoxidepolyoxyalkylenediamine adduct of Example 2A and the sulfamic acid based pigment paste of Example 2E. The bath would be formulated to equal the polyepoxidepolyoxy-alkylenediamine adduct content of Example III of U.S. Pat. No. 4,933,056.

The bath would be prepared from the following ingredients:

TABLE IIIA

| Ingredients | Parts by Weight | Solids |
| --- | --- | --- |
| Cationic Resin of Ex. G-3 of U.S. Pat. No. 4,933,056 | 1413.02 | 505.86 |
| Additive of Example 2A | 177.12 | 60.22 |
| PARAPLEX WP-1[1] | 36.13 | 36.13 |
| Deionized water | 1982.23 | — |
| Pigment Paste of Example 2E | 391.50 | 233.17 |
| | 4000.0 | 835.38 |

[1] A propoxylated cresol commercially available from Rohm and Haas.

A comparison of the acid contents of Example III of U.S. Pat. No. 4,933,056 ('056) and Example III herein would be as follows:

TABLE IIIB

| Meq/Acid/Grams Solids | Ex. III ('056) | Ex. III |
| --- | --- | --- |
| Acetic Acid (from Main Vehicle) | 0.00718 | 0.00734 |
| Acetic Acid (from Polyepoxidepolyoxypropylenediamine Adduct) | 0.0175 | — |
| Acetic Acid Total | 0.0247 | 0.00734 |
| Lactic Acid (from Grind Vehicle)* | 0.0280 | — |
| Sulfamic Acid (from Main Vehicle) | 0.1672 | 0.1711 |
| Sulfamic Acid (from Polyepoxide-polyoxyalkylenediamine Adduct) | — | 0.0232 |
| Sulfamic Acid (from Vehicle Grind) | — | 0.0153 |
| Sulfamic Acid Total | 0.1672 | 0.2096 |
| ALL ACIDS TOTAL | 0.2199 | 0.2170 |

*Assuming complete hydrolysis of all lactones and lactides.

TABLE IIIC

| | Example III ('056) | Example III |
| --- | --- | --- |
| % Acetic Acid Equivalent | 11.23 | 3.38 |
| % Lactic Acid Equivalent | 12.73 | 0.00 |
| % Sulfamic Acid Equivalent | 76.04 | 96.62 |
| TOTAL | 100.00 | 100.00 |

Alternatively, the minimum replacement of sulfamic acid for acetic and/or lactic neutralizing acid could be just to leave the grind with lactic acid and replace other acids with sulfamic. Therefore, the range of the percent of Acid Equivalent Weight of sulfamic acid as in Table IIIC could be from greater than 90 to 100 percent.

We claim:

1. A process for reducing the bacterial count of an electrodeposition bath composition having a cationic electrodepositable composition comprising a resinous phase dispersed in an aqueous medium, said bath composition having a pH of at least about 5, said resinous phase having basic nitrogen groups which are at least partially neutralized with an acid of the formula:

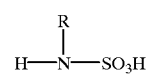

Formula 1 wherein R is hydrogen or an alkyl group with one to four carbon atoms, which includes maintaining the bath composition at a pH in the range of at least about 5 to about 8 by the addition of sulfamic acid of formula 1 to the bath composition.

2. Process of claim 1 wherein the sulfamic acid of Formula 1 is added to the bath composition as an aqueous solution having a concentration of sulfamic acid in the range of from about 10 to about 20 percent weight/weight.

3. The process of claim 1 wherein the bath composition contains less than about 2,000 ppm lead.

4. The process of claim 1 wherein the bath composition was first neutralized at a temperature of from about 20° C. to about 100° C.

5. The process of claim 1 wherein the neutralization of the basic nitrogen groups of amines and/or quaternary amines of the resinous phase involves neutralization to a degree sufficient for water dispersibility of the resin.

6. The process of claim 1 wherein the neutralization of the basic nitrogen groups of amines and/or quaternary amines of the resinous phase is at least about 20 percent of the total theoretical neutralization of the amines wherein greater than 90 equivalent weight percent of the milliequivalents of acid for such neutralization is sulfamic acid of Formula 1.

7. The process of claim 1 wherein the resinous phase is comprised of a plurality of resinous materials at least one of which is neutralized with sulfamic acid of Formula 1.

8. The process of claim 1 wherein the resinous phase is neutralized for the percentage of total theoretical neutralization through the presence of sulfamic acid of Formula 1.

9. The process of claim 1 which contains as basic nitrogen groups primary amine groups.

10. The process of claim 1 in which the dispersed resinous phase is present in amounts of about 2 to about 60 percent by weight based on the total weight of electrocoating composition.

11. The process of claim 1 wherein the bath composition is maintained at a pH in the range of 5.5 to 6.5 by the addition of sulfamic acid of Formula 1 to the bath composition.

* * * * *